United States Patent
Sanders et al.

(10) Patent No.: US 6,268,822 B1
(45) Date of Patent: Jul. 31, 2001

(54) DUAL-FREQUENCY MILLIMETER WAVE AND LASER RADIATION RECEIVER

(75) Inventors: Ross J. Sanders, Newbury Park; John D. Shmoldas, Thousand Oaks; Dean Arthur Wicks, Newbury Park, all of CA (US)

(73) Assignee: Alenia Marconi Systems Inc., Westlake Village, CA (US)

( * ) Notice: Subject to any disclaimer, the term of this patent is extended or adjusted under 35 U.S.C. 154(b) by 0 days.

(21) Appl. No.: 09/454,541

(22) Filed: Dec. 7, 1999

(51) Int. Cl.[7] .................................................. G01S 7/486
(52) U.S. Cl. ........................... 342/54; 342/62; 342/175; 343/725; 343/753
(58) Field of Search .................................. 342/53, 54, 62, 342/63, 175; 343/725, 781 CA, 720, 700 MS, 771, 911 R, 753, 909, 729, 770, 754, 846

(56) References Cited

U.S. PATENT DOCUMENTS

| | | | |
|---|---|---|---|
| 3,165,749 | | 1/1965 | Cushner ................................ 343/911 |
| 4,085,910 | * | 4/1978 | Baker et al. ........................ 244/3.16 |
| 4,095,230 | * | 6/1978 | Salmond et al. ..................... 343/729 |
| 4,107,529 | * | 8/1978 | Chicklis et al. ................ 250/339.14 |
| 4,108,400 | * | 8/1978 | Groutage et al. ................... 244/3.15 |
| 4,282,527 | | 8/1981 | Winderman et al. ................ 343/725 |
| 4,348,677 | * | 9/1982 | Salmond .............................. 343/729 |
| 4,477,814 | | 10/1984 | Brumbaugh et al. ............... 343/725 |
| 4,491,845 | * | 1/1985 | Rothenberg ......................... 343/754 |
| 4,636,797 | * | 1/1987 | Saffold et al. ...................... 343/725 |
| 4,652,885 | * | 3/1987 | Saffold et al. ...................... 343/725 |
| 4,698,638 | * | 10/1987 | Branigan et al. ................... 343/725 |
| 5,023,623 | * | 6/1991 | Kreinheder et al. ................ 343/725 |
| 5,130,718 | | 7/1992 | Wu et al. ....................... 343/781 CA |
| 5,182,564 | * | 1/1993 | Burkett et al. ........................ 342/53 |
| 5,214,428 | | 5/1993 | Brusgard, et al. .................. 343/725 |
| 5,307,077 | * | 4/1994 | Branigan et al. ................... 343/720 |
| 5,327,149 | * | 7/1994 | Kuffer ................................. 343/720 |
| 5,373,302 | | 12/1994 | Wu ................................. 343/781 P |
| 5,394,163 | * | 2/1995 | Bullen et al. ....................... 343/771 |
| 5,458,041 | * | 10/1995 | Sun et al. ............................. 89/1.11 |
| 5,538,205 | * | 7/1996 | Bitson ................................. 244/3.16 |
| 5,674,874 | | 6/1987 | Halldorsson et al. .............. 356/152 |
| 5,784,156 | | 7/1998 | Nicholson ........................ 356/141.5 |
| 5,825,063 | | 4/1989 | Halldorsson et al. ........... 250/203 R |
| 5,973,649 | * | 10/1999 | Andressen ......................... 343/720 |
| 6,150,974 | | 11/2000 | Tasaka et al. ......................... 342/53 |

FOREIGN PATENT DOCUMENTS

| | | |
|---|---|---|
| 94 21 991 U1 | 9/1997 | (DE) . |
| 2318236 * | 4/1998 | (GB) ............................... F41G/7/22 |

* cited by examiner

Primary Examiner—John B. Sotomayor
(74) Attorney, Agent, or Firm—Kirschstein, et al.

(57) ABSTRACT

A tandem dual-frequency sensor for a missile that uses a steerable dichroic primary millimeter wave reflector to reflect millimeter wave energy to a secondary reflector while passing laser light in the infra-red region through a dichroic region of the reflector to multiple staring laser detectors mounted behind the primary reflector.

6 Claims, 5 Drawing Sheets

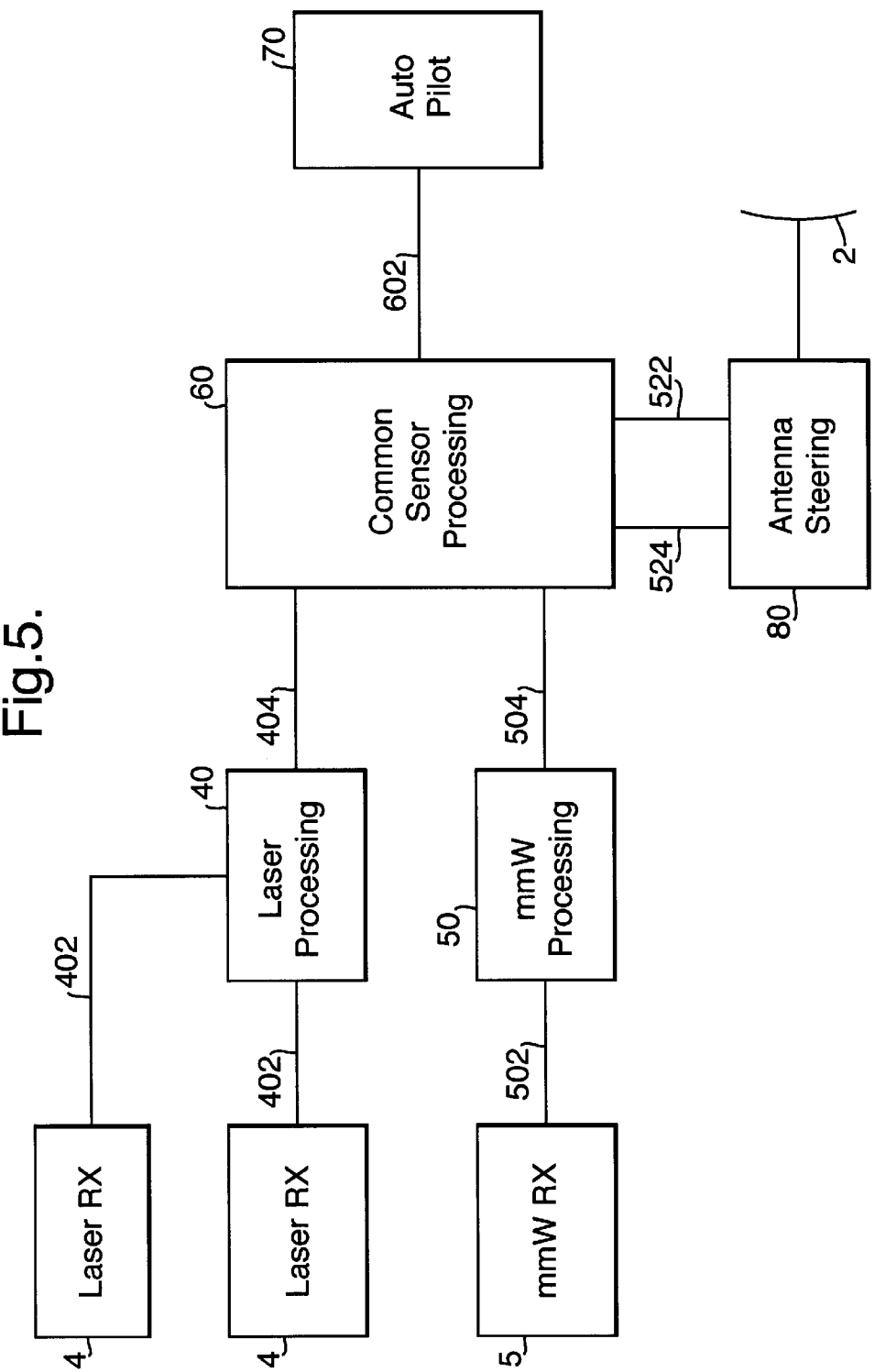

DUAL-FREQUENCY MILLIMETER WAVE AND LASER RADIATION RECEIVER

BACKGROUND OF THE INVENTION

This invention relates to dual-frequency receivers, responsive to both millimeter band radiation and to laser radiation.

Dual-frequency detectors responsive to both microwave and infra-red radiation are found in the target seeking systems of aircraft, both piloted aircraft and guided missiles. To obtain an unrestricted field of view, such sensors are generally located at the nose of the aircraft or missile. The prior art teaches to provide reflector systems to provide directivity and gain for detectors of both wavelengths. Such reflector systems are generally of concave or Cassegrain configuration designed on classical optical principles. To obtain maximum resolution and sensitivity, the aperture of the reflecting system should be as large as possible, and in a missile seeker system generally occupies as much of the missile cross-section as possible. This means that both wavebands have to use the same aperture, and such systems are commonly referred to as common aperture receivers.

In a conventional reflecting system consisting of purely reflecting elements, all wavelengths are brought to focus at the same point. While U.S. Pat. No. 4,282,527 teaches wavelength discrimination by providing a fiber optic cable coaxially with a microwave waveguide at the focus of a reflecting system to guide infra-red radiation and microwave radiation to respective sensors in different locations remote from the focus, the more usual approach is to incorporate one or more dichroic elements in the reflecting system so as to bring different wavelengths to a focus on different detectors at different points in space. Examples of such prior art arrangements are disclosed in U.S. Pat. No. 5,373,302; No. 5,327,149; No. 5,214,438; No. 5,130,718; and No. 3,165,749.

It is also known to provide dual mode detectors where the reflecting system only reflects and focusses infra-red radiation. Microwave radiation is sensed by an array of antennas located either on the surface of a principal infra-red radiation reflector or else behind a principal dichroic reflector which is transparent to microwaves. Such arrangements are disclosed in U.S. Pat. No. 4,477,814 and No. 5,307,077, respectively.

In these prior art arrangements, the component parts of the dual mode detectors, that is to say, the respective detectors responsive to different wavebands and the reflecting systems associated therewith, have been in fixed spatial relationship to each other. Beam steering has involved physically steering the reflecting system and both detectors. This has necessitated the provision of correspondingly robust gimbal arrangements and the need for relatively powerful actuators to overcome the inertia of the reflectors and detectors.

SUMMARY OF THE INVENTION

It is an object of the present invention to provide an improved dual mode tandem seeker configuration in which the disadvantages of the prior art are at least ameliorated.

The present invention provides a tandem laser and millimeter wave receiver for a moving vehicle and for providing directional information of a target to a guidance system for the vehicle. The invention comprises a primary reflector comprising a peripheral region transparent to laser radiation and reflective to millimeter wave radiation; a secondary reflector reflective to millimeter wave radiation and arranged to receive and reflect millimeter waves reflected from the primary reflector; annular laser receiver means comprising a plurality of discrete laser receiver means arranged in a ring behind the peripheral region to receive laser radiation passing through the peripheral region; millimeter wave receiving means arranged to receive the millimeter waves reflected from the secondary reflector; processor means arranged to receive signals from the annular laser receiver means and the millimeter wave receiving means and to generate therefrom target position signals; and means to fasten the primary reflector, the secondary reflector, the annular laser receiver means, the millimeter wave receiving means, and the processor means together within the envelope of the vehicle.

The present invention provides full use of the common receiver aperture areas for the laser and millimeter wave collectors with a common diameter.

BRIEF DESCRIPTION OF THE DRAWINGS

Embodiments of the invention will now be described by way of non-limiting example only, with reference to the drawings in which:

FIG. 5 shows a block diagram of a guidance system.

DETAILED DESCRIPTION OF THE PREFERRED EMBODIMENT

Figure 1:
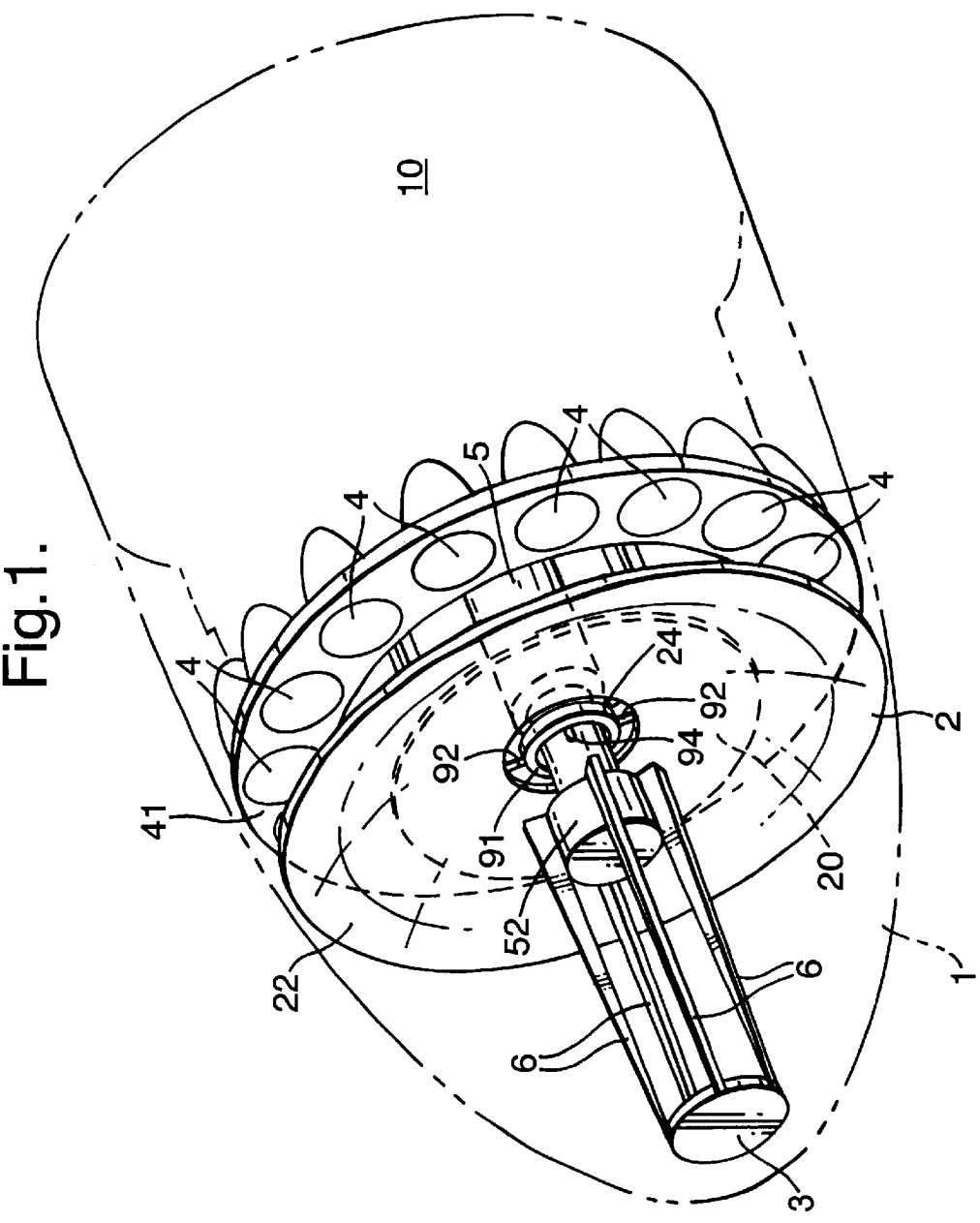
FIG. 1 shows a schematic perspective view of a first dual-frequency seeker for detecting radar radiation in the millimeter radar band and laser radiation in the infrared band.
Figure 2:
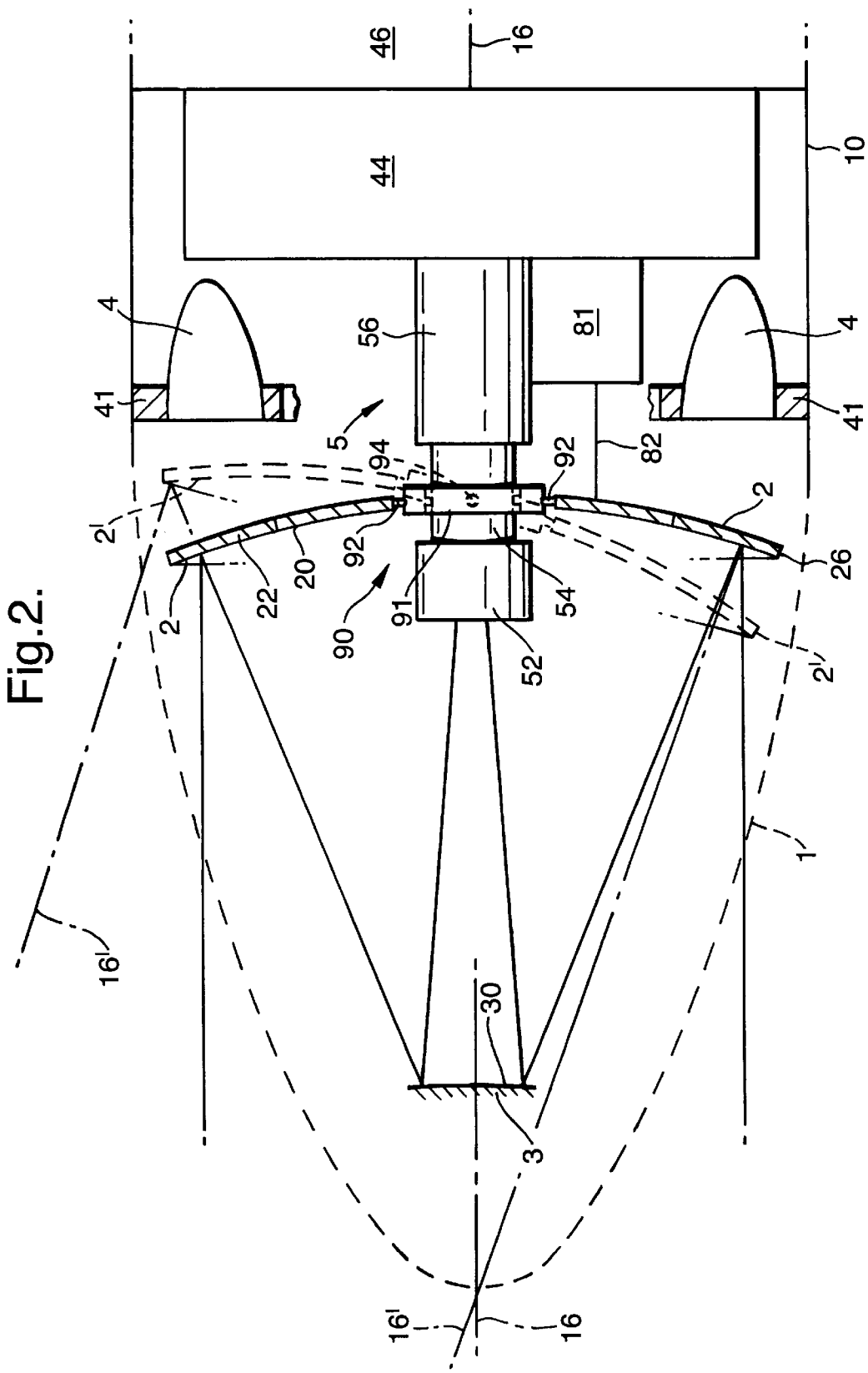
FIG. 2 shows a simplified longitudinal section through FIG. 1.
Figure 3:
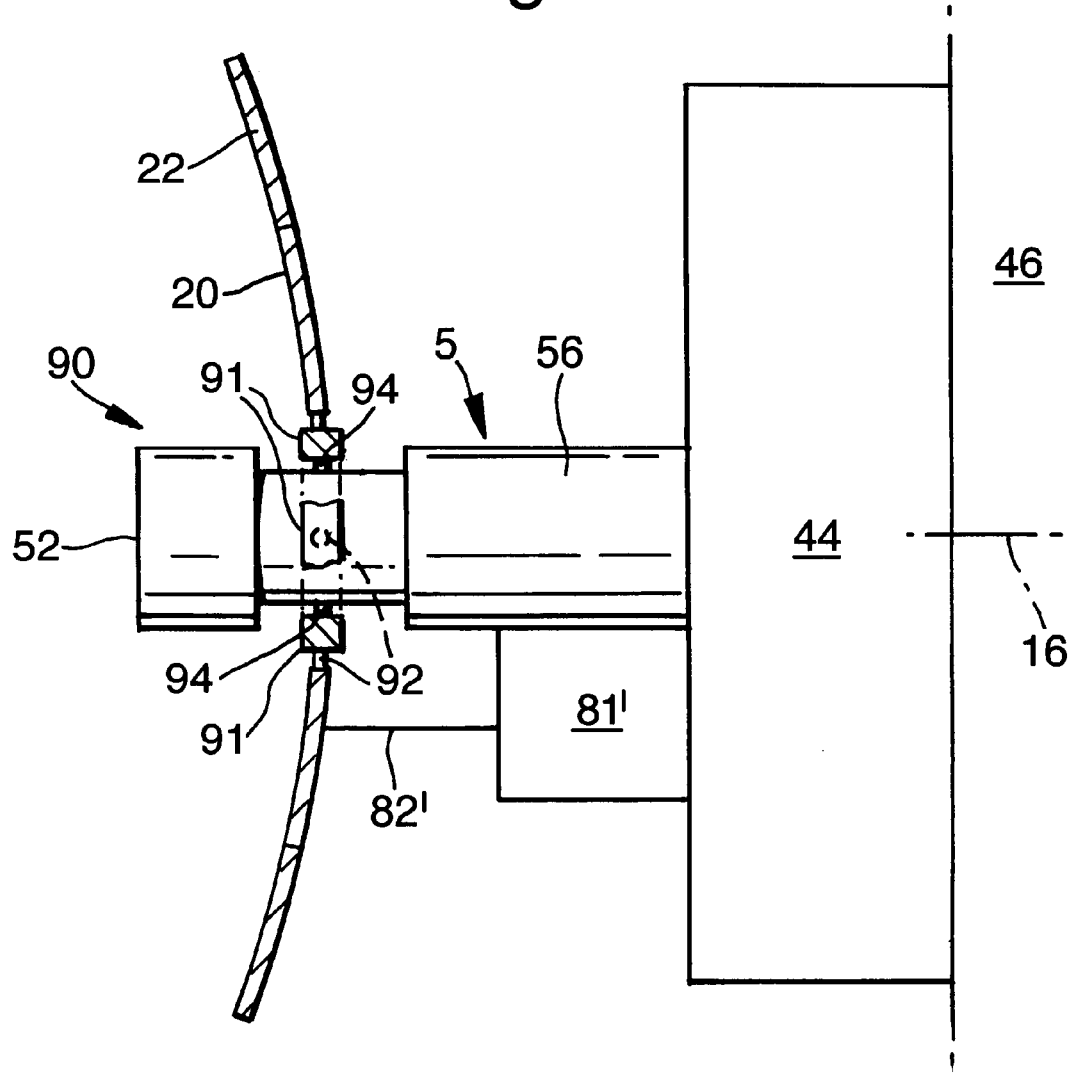
FIG. 3 shows simplified longitudinal section through part of FIG. 1 at right angles to FIG. 2.

Referring now to FIGS. 1, 2 and 3, a radome 1 transparent to radiation of both millimeter and infra-red wavelengths covers the forward end of the body of a missile 10. Only the forward extremity of the missile is shown in the drawing. An annular array of discrete laser receivers 4 is located within the radome 1. Receivers 4 are mounted in an annular support 41 which is secured to the missile body 10. Receivers 4 are thereby immovably attached (strapped down) to the missile body 10. The receivers per se are of the type described in U.S. Pat. No. 5,784,156, the contents of which are hereby incorporated by reference herein. As will be described in more detail below, receivers 4 are configured as a staring array looking generally ahead in the direction of travel of the missile.

A concave reflector 2 has an annular peripheral dichroic region 22, an inner reflective region 20 and a central aperture 24. Dichroic region 22 transmits infra-red laser radiation and reflects microwave radiation.

A strap-down microwave detector, shown generally by 5, is mounted on a first housing 44 containing microwave receiver components. Housing 44 is itself mounted on a second housing 46 containing common processing circuitry for the microwave receiver and the laser receivers. Second housing 46 is attached to the missile body 10.

Microwave detector 5 is generally cylindrical in shape and consists of a forward portion 52, an intermediate portion 54 and a rearward portion 56. Forward portion 52 receives incident microwave radiation. Intermediate portion 54 is of smaller diameter than forward portion 52 and rearward portion 56.

Reflector 2 is mounted to detector 5 via a gimbal arrangement 90 arranged within an aperture 24 at the center of the reflector 2. The gimbal arrangement consists of an annular ring-shaped member 91 having a first pair of pivots 92 arranged on the opposite sides of the radially outer surface thereof by which ring 91 is coupled to reflector 2, and a second pair of pivots 94 on opposite sides of the radially inner surface thereof by which ring 91 is coupled to detector 5.

A convex reflector 3 has a reflective surface 30 which reflects microwave radiation. Convex reflector 3 is attached to, and maintained in alignment with, the forward portion 52 of detector 5 by supports 6.

Referring to FIG. 2, elevation adjustment of reflector 2 is effected by a first actuator 81 mounted on the rearward portion 56 of detector 5 and coupled via a first mechanical linkage 82 to the rear surface of reflector 2. It will be seen that an incremental movement of linkage 82 by actuator 81 will result in an incremental tilt of reflector 2 in elevation. FIG. 3 shows the corresponding arrangement for adjusting azimuth consisting of a second actuator 81' and second linkage 82' arranged orthogonal to the elevation adjustment arrangement shown in FIG. 2. Second actuator 81' and second linkage 82' of FIG. 3 perform the same functions as first actuator 81 and first linkage 82 of FIG. 2 but in respect of azimuth instead of elevation, and will therefore not be described further.

In the present embodiment, concave reflector 2 consists of a polycarbonate concave substrate 26 which is transparent to infra-red laser radiation. The concave surface of the substrate is coated with a thin layer of a metal which, in the present embodiment, is gold. The metal coating is continuous in inner region 20. In outer dichroic region 22, the metal coating is not continuous, metal being present in a pattern to leave areas of the substrate exposed. The dimensions of the metal-coated regions and exposed regions are such that infra-red laser radiation passes through outer dichroic region 22 with minimal attenuation, while microwave radiation is substantially totally reflected. The design and construction of such patterns exhibiting dichroic behavior are well known to those skilled in the art and will therefore not be described further.

Concave reflector 2 may be moved from a position in which it detects radiation incident from the boresight axis 6 to a position, shown by dashed lines and indicated by primed numbers 2', where it detects radiation from an off-boresight direction as indicated by chain dashed lines 16'.

Gimbal 90, actuators 81, 81' and associated linkages 82, 82', microwave detector 5 and secondary reflector 3 are arranged in the radially central region of primary reflector 2 and, as such, do not obscure the field of view of laser receivers 4. This means that by making the entire outer perimeter of primary reflector 2 transparent to infra-red laser light, an unobstructed field of view for receivers 4 is obtained without physically mounting receivers 4 on the same gimbaled platform as the concave reflector 2. This allows laser receivers and microwave receiver to respond simultaneously to radiation from the same field of view.

Figure 4:
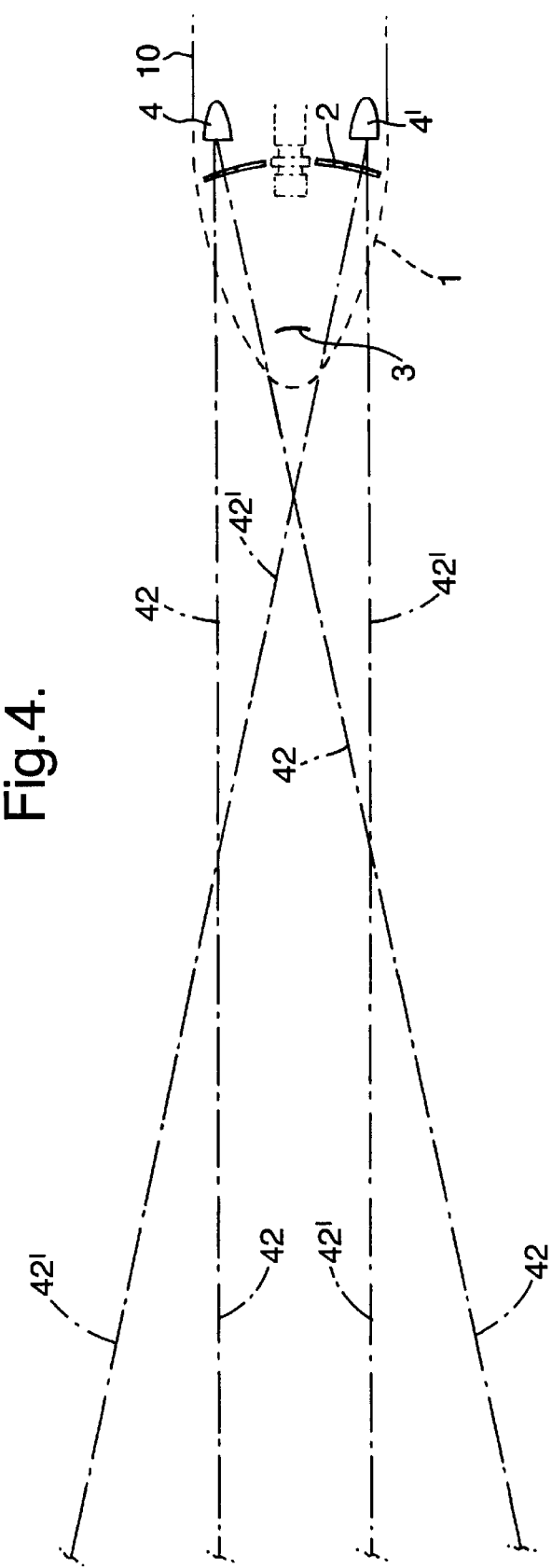
FIG. 4 is a simplified version of FIG. 2 on a reduced scale illustrating the overlap of the fields of view of two laser detectors.

As shown in FIG. 4, beams 42 of receivers 4 overlap. Receivers 4 are arranged so that their combined fields of view cover a greater field of view than that of a single receiver and provide complete coverage of a predetermined field ahead of the missile. The overlap between the fields of the individual receivers is such that each point within the predetermined field lies within the field of view of at least two different laser receivers. It will be seen that convex reflector 3 does not obscure the field of view seen by the laser receivers.

Radiation received by the receivers is fed via fiber optic cables to a signal processing arrangement which determines the direction of incident laser radiation from the relative amplitudes of radiation received at different receivers. Such techniques are well known to the skilled person, inter alia, from U.S. Pat. No. 5,784,156; No. 4,825,063; and No. 4,674,874, the contents of which are hereby incorporated herein by reference, and will not be described further.

The sensors disclosed in U.S. Pat. No. 5,784,156 are arranged at the exterior of a missile and thus look directly at their respective field of view. In the present invention, it will be appreciated that receivers 4 do not look directly at their respective fields of view, but look through both dichroic region 22 of reflector 2 and radome 1. Because radome 1 is in a fixed spatial relationship to detectors 4, any distortion in the wavefront of radiation incident on receivers 4 caused by its passage through radome 1 which would make radiation appear to come from a different direction from its true bearing can be compensated for during calibration. Further wavefront distortion may arise from its passage through dichroic region 22 of reflector 2. Because reflector 2 is movable, there is a possibility that distortion may vary with reflector position. If any such distortion has a significant effect on accuracy, it may be necessary to provide compensation.

This can be effected in a number of different ways according to operational requirements.

If it is not necessary to use the laser receivers and microwave receiver simultaneously, then the reflector can be set to a predetermined position, e.g., aligned with the missile boresight, during laser reception. The system can then be calibrated with the reflector in the predetermined position. Alternatively, if simultaneous operation is required, then the laser receivers can be calibrated with the reflector in a number of different positions. The orientation of the reflector will, of course, be available from the circuitry which steers the reflector. Information about the radar reflector position can be used by the laser receiver processing circuitry to provide appropriate compensation, e.g., by using a look-up table and interpolation. Such compensation techniques are well known to the skilled person and will not be described further.

Referring now to FIG. 5, laser receivers 4 provide signals via fiber optic cables 402 to laser processing circuit 40. Only two laser receivers 4 are shown in the interest of clarity. The laser processing circuit 40 processes the signals on cables 402 and obtains therefrom information regarding the azimuth and elevation of a target in the manner described in U.S. Pat. No. 5,784,156. This information is supplied via line 404 to a first input of common sensor processing circuit 60.

Received signals from millimeter wave radar receiver 5 are supplied via line 502 to millimeter wave processing circuit 50. Information about target bearing is fed via line 504 to a second input of common sensor processing circuit 60. Signals from common sensor processing circuit 60 are fed via line 522 to antenna steering circuit 52 which steers the steerable reflector 2. Information about the position of reflector 20 is fed from antenna steering circuit 52 back to common sensor processing circuit 60 via line 524. An output 602 of common sensor processing circuit 60 provides steering commands to an autopilot 70 which steers the missile.

The components associated with the generation and transmission of millimeter wave radar signals are conventional.

They have therefore been omitted in the interest of clarity as they are not relevant to the present invention.

This tandem configuration of a gimbaled millimeter wave primary reflector and non-gimbaled laser receiver allows both the amount of electrical connections required and the gimbaled mass to be reduced, thereby reducing the demands on the actuators which steer the gimbaled reflector and providing instantaneous reception of laser pulses from the entire sensor field of view.

While the above-described embodiment utilizes a Cassegrain-type reflector system, the invention is not limited thereto and may equally well be performed using other reflector configurations. For example, the microwave detector may be placed at the focus of the reflector system, the receiver beam being steered by moving the reflector system and receiver as a unit while the laser receiver array remains strapped down to its platform.

Numerous modifications are possible within the scope of the invention. Instead of a pattern of conductors, the dichroic region 22 may consist of a material such as indium tin oxide which possesses intrinsic dichroic properties, i.e., is transparent to infra-red radiation and reflects microwave radiation.

Alternatively, the dichroic region 22 may consist of a continuous layer of metal, the layer being sufficiently thin to allow a significant amount of infra-red laser radiation to pass therethrough and sufficiently thick to reflect microwave radiation. The dichroic region may also be implemented using alternative frequency-selective resonant structures known per se which exhibit the necessary dichroic properties.

While in the described embodiment, the fixed convex reflector 3 of the Cassegrain reflector is attached to the receiver it may alternatively be attached directly to the radome 1.

While the embodiment has a central aperture through which microwave radiation passes, this is not essential. In arrangements where the microwave receiver and gimbal lie wholly behind the primary reflector, and the substrate is intrinsically transparent to microwaves, the aperture may consist of an uncoated portion of the substrate, rather than a physical aperture per se. The transparent substrate need not be polycarbonate, but may be any other material having the necessary dimensional stability and transparency. It is evident that it is only necessary for the substrate to be transparent to those wavelengths to which the receivers 4 therebehind are to respond. The transparency of the substrate to other wavelengths is irrelevant to the invention.

While the above described non-limiting embodiment has described the invention as applied to a missile, the invention is not limited thereto. It may be equally well applied to other guided munitions as well as other fields where sensors of two different wavelengths need to pass through a common aperture.

Thus for use in space applications beyond planetary atmospheres, it is not necessary to provide a radome, which is provided only for aerodynamic streamlining.

It will be seen that the present invention provides a dual frequency seeker that uses a tandem placement of the energy gathering systems for both laser and millimeter wave radiation. A feature of the invention is that the forward energy gathering system (the concave reflector) is constructed to be transparent to the frequency of the rear energy-collecting system (the laser detectors). The energy for the rear system passes through the forward system and is collected by the rear system. This arrangement allows the simultaneous use of the entire aperture for each of the frequencies. The other components of the seeker need not be placed in a tandem configuration. They can be placed in various configurations as long as the energy gathering systems are in tandem configuration. The tandem placement allows more streamlined dual sensor configurations allowing each of the sensors to perform to their own technical limit within the full diameter of the missile preserving each sensor's maximum detection ranges and aerodynamic performance. Common use of radomes, mounting structures and processors can significantly reduce the number of components while providing increased system performance. Parts count and complexity can be reduced, yielding lower costs.

We claim:

1. A tandem laser and millimeter wave receiver for a moving vehicle and for providing directional information of a target to a guidance system for the vehicle, comprising:

a primary reflector including a peripheral region transparent to laser radiation and reflective to millimeter wave radiation;

a secondary reflector reflective to millimeter wave radiation and arranged to receive and reflect millimeter waves reflected from the primary reflector;

annular laser receiver means including a plurality of discrete laser receiver means arranged in a ring behind the peripheral region to receive laser radiation passing through the peripheral region;

millimeter wave receiving means for receiving the millimeter waves reflected from the secondary reflector;

processor means for receiving signals from the annular laser receiver means and the millimeter wave receiving means, and for generating therefrom target position signals; and means for fastening the primary reflector, the secondary reflector, the annular laser receiver means, the millimeter wave receiving means, and the processor means together within an envelope of the vehicle.

2. The tandem receiver as claimed in claim 1; and further comprising a radome transparent to millimeter waves and laser waves, and arranged to cover the reflectors and the laser and millimeter wave receiver means.

3. The tandem receiver as claimed in claim 1; and further comprising window means transparent to millimeter waves and laser waves, and arranged in front of the primary reflector so that radiation sensed by the plurality of discrete laser receiver means passes through the window means.

4. The tandem receiver as claimed in claim 1, wherein the primary reflector is movable.

5. A guided munition including a tandem laser and millimeter wave receiver for the munition and for providing directional information of a target to a guidance system for the munition, comprising:

a primary reflector including a peripheral region transparent to laser radiation and reflective to millimeter wave radiation;

a secondary reflector reflective to millimeter wave radiation and arranged to receive and reflect millimeter waves reflected from the primary reflector;

annular laser receiver means including a plurality of discrete laser receiver means arranged in a ring behind the peripheral region to receive laser radiation passing through the peripheral region;

millimeter wave receiving means for receiving the millimeter waves reflected from the secondary reflector;

processor means for receiving signals from the annular laser receiver means and the millimeter wave receiving means, and for generating therefrom target position signals; and means for fastening the primary reflector, the secondary reflector, the annular laser receiver means, the millimeter wave receiving means, and the processor means together within an envelope of the munition.

6. A missile including a tandem laser and millimeter wave receiver for the missile and for providing directional information of a target to a guidance system for the missile, comprising:

a primary reflector including a peripheral region transparent to laser radiation and reflective to millimeter wave radiation;

a secondary reflector reflective to millimeter wave radiation and arranged to receive and reflect millimeter waves reflected from the primary reflector;

annular laser receiver means including a plurality of discrete laser receiver means arranged in a ring behind the peripheral region to receive laser radiation passing through the peripheral region;

millimeter wave receiving means for receiving the millimeter waves reflected from the secondary reflector;

processor means for receiving signals from the annular laser receiver means and the millimeter wave receiving means, and for generating therefrom target position signals; and means for fastening the primary reflector, the secondary reflector, the annular laser receiver means, the millimeter wave receiving means, and the processor means together within an envelope of the missile.

* * * * *